April 20, 1965 A. B. MAYFIELD ETAL 3,178,965
DRIVING-STEERING TRANSMISSION
Filed May 10, 1962 3 Sheets-Sheet 1
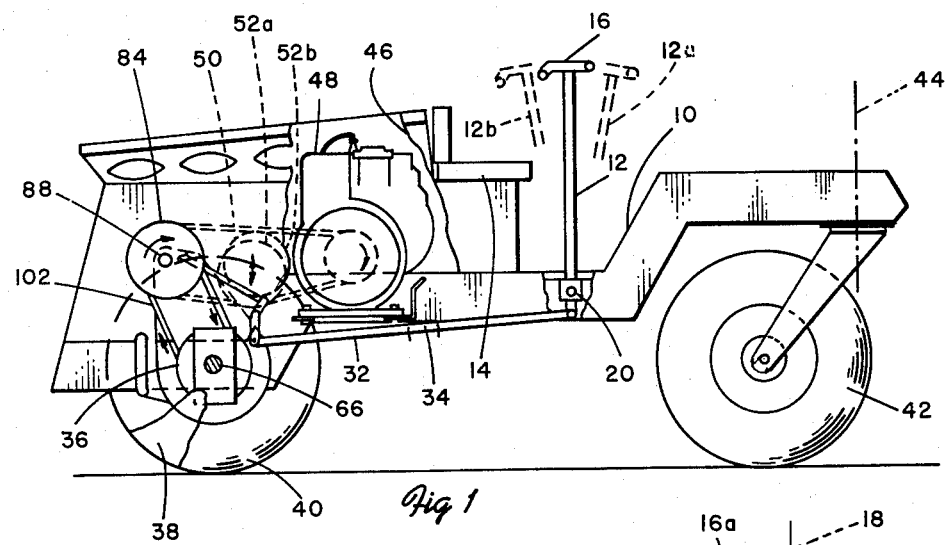
Fig 1
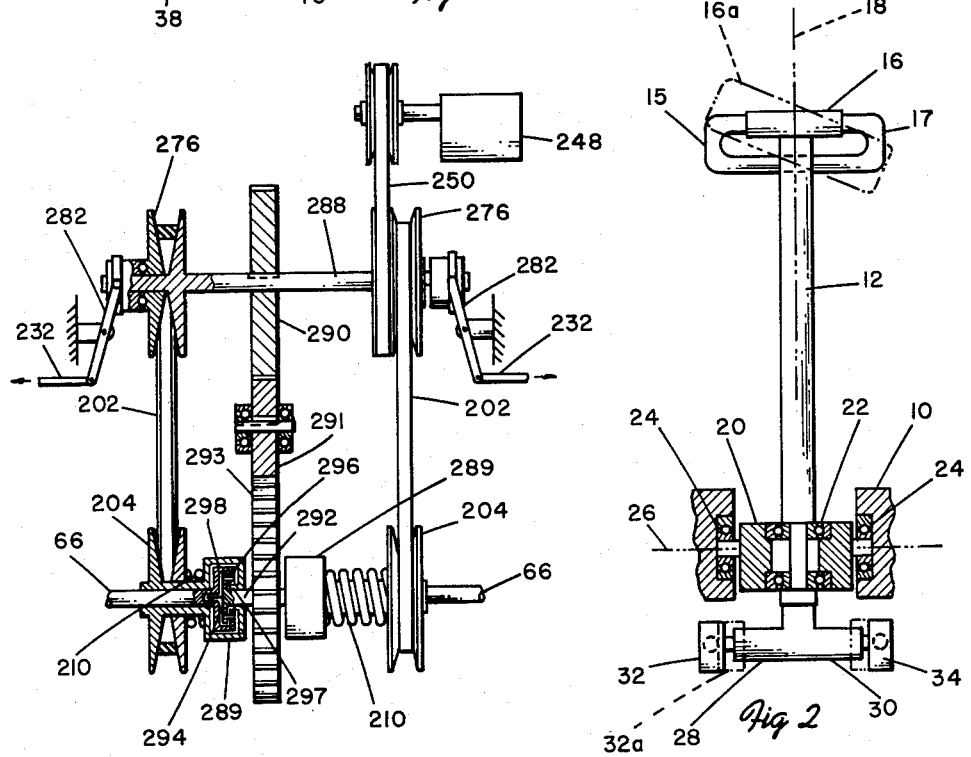
Fig 7
Fig 2
INVENTOR.
ALFRED B. MAYFIELD
MARVIN C. DARLING
BY
Hubert Miller
ATTORNEY

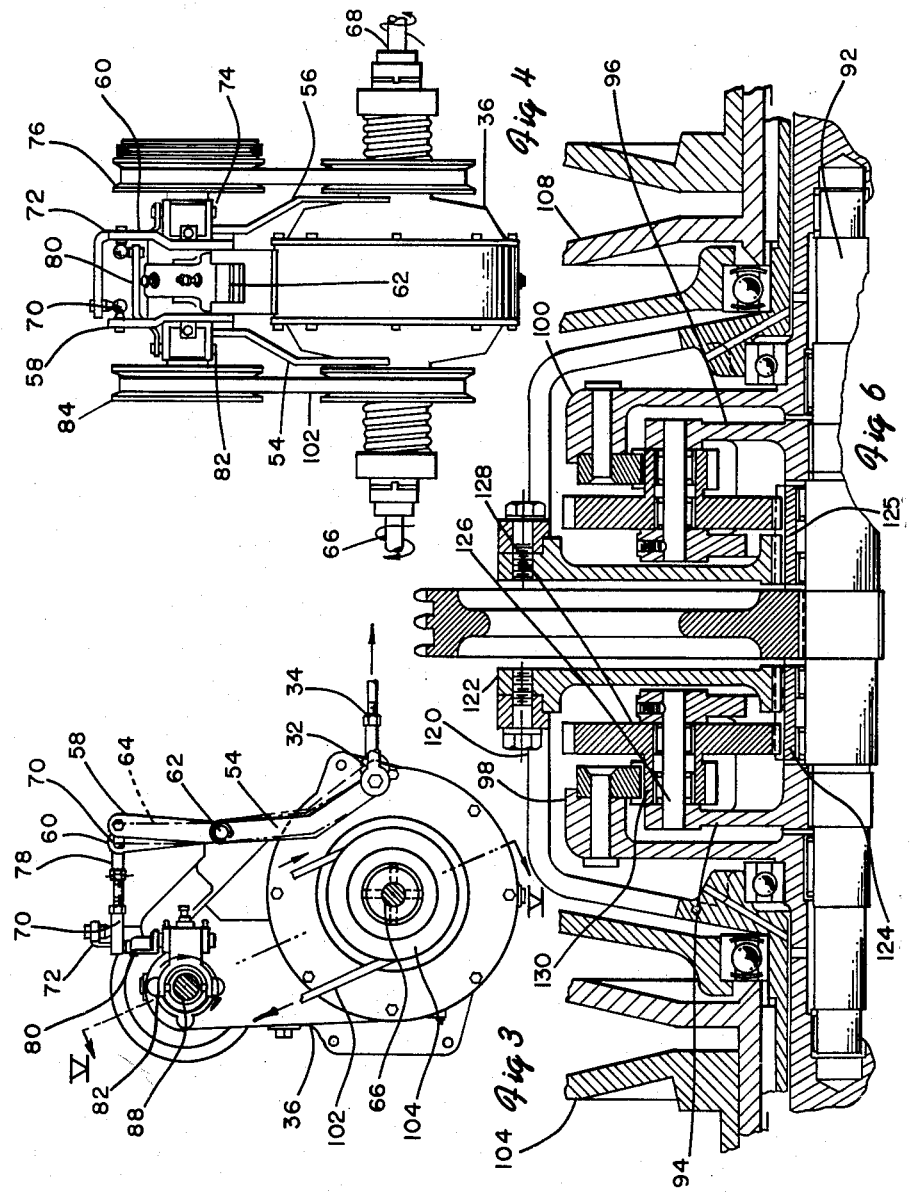

United States Patent Office 3,178,965
Patented Apr. 20, 1965

3,178,965
DRIVING-STEERING TRANSMISSION
Alfred B. Mayfield, Halstead, and Marvin C. Darling, Burrton, Kans., assignors to Davis Manufacturing, Inc., Wichita, Kans., a corporation of Kansas
Filed May 10, 1962, Ser. No. 193,815
1 Claim. (Cl. 74—722)

The present application relates to a driving-steering transmission system for power driven vehicles. More particularly, it relates to the control of power transmission as well as to the device for effecting transmission of power including variable pitch line belts for smoothly varying the transmission ratio.

This application is a continuation-in-part of co-pending Mayfield et al. application Serial Number 754,441, filed August 11, 1958, now U.S. Patent No. 3,091,132.

In accordance with the invention, we provide a common transmission device, producing separate output drives to the wheel tracks or ground wheels carried at opposite sides of the vehicle, and accomplishing the steering function solely by driving the wheels at differential speeds. By novel use of an individual friction belt with an associated gearing unit disposed one at each side of the final drive of the transmission, individual control is afforded over the wheel at that side whereby the wheels can additionally be driven oppositely, drastically turning the vehicle and also driven one way or the other precisely together making the vehicle advance straight or back in the reverse direction as desired.

The present friction belt type variable ratio system obviates the need for wheel brakes or shaft brakes in the conventional sense. Likewise it obviates the regular steering gear mechanism at the front and differential for the rear axle, all of which are common under current vehicle practices. The control provided for our system resides in a simple unilever member mounted to pivot at a steering location point in the vehicle, the unilever being turnable on the longitudinal axis of the lever and tiltable about a fixed horizontal axis which is transversely disposed in the vehicle. The transmission device is adapted to respond to simple or pure motion of either type referred to and to any degree of compounding of those motions, always to cause the vehicle to respond by its movement in direction along a steered course in accordance with a natural feel or sense of steering.

Therefore an object of the invention is the provision of a transmission particularly adapted to respond to a unitary or unilever control member enabling steering of the vehicle to be accomplished by driving the vehicle.

Another object is to provide a vehicle transmission with a primary power path or train and individual secondary trains, disposed one at each side of the final drive and coupled to the adjacent ground wheel shaft. The secondary train at each side cooperates with the common primary train to form a split path drive controlling the speed and direction of the shaft at that side.

An additional object in line with the foregoing objectives is the provision of individual transmission levers on the respective sides of the transmission and drivingly connected to the unilever control member by a system of cross connections whereby the control lever simultaneously selects and adjusts the transmission levers independently of one another.

It is a further object to effect said cross connections between the transmission levers and portions of the control member such that each side of the control member controls only the opposite side of the transmission. This mode of control is illustrative of a preferred way of accomplishing an important principle of the present invention, namely the principle whereby steering by driving follows the natural instinct or sense of the driver irrespective of the way in which he chooses to face and toward which he proceeds.

Further features, objects, and advantages of the invention will either be specifically pointed out or become apparent when reference is made to the following description, taken in conjunction with the accompanying drawings which form a part hereof and in which:

FIGURE 1 is a view in side elevation of a vehicle which embodies the present invention and in which the control lever is shown in a neutral position and in opposite positions tilted therefrom;

FIGURE 2 is a front elevational view of the control lever in the neutral position the same as in FIGURE 1 and in other position partially turned therefrom;

FIGURE 3 is a view of the transmission appearing in FIGURE 1, and similarly shown in side elevation;

FIGURE 4 is a view of the transmission of FIGURE 3 but in front elevation;

FIGURE 6 is a fragmentary enlargement of a portion of FIGURE 5 to show the precise connections of the planetary components of the transmission; and FIGURE 7 is a showing, primarily schematic, of a modified embodiment of the transmission system.

Figure 5:
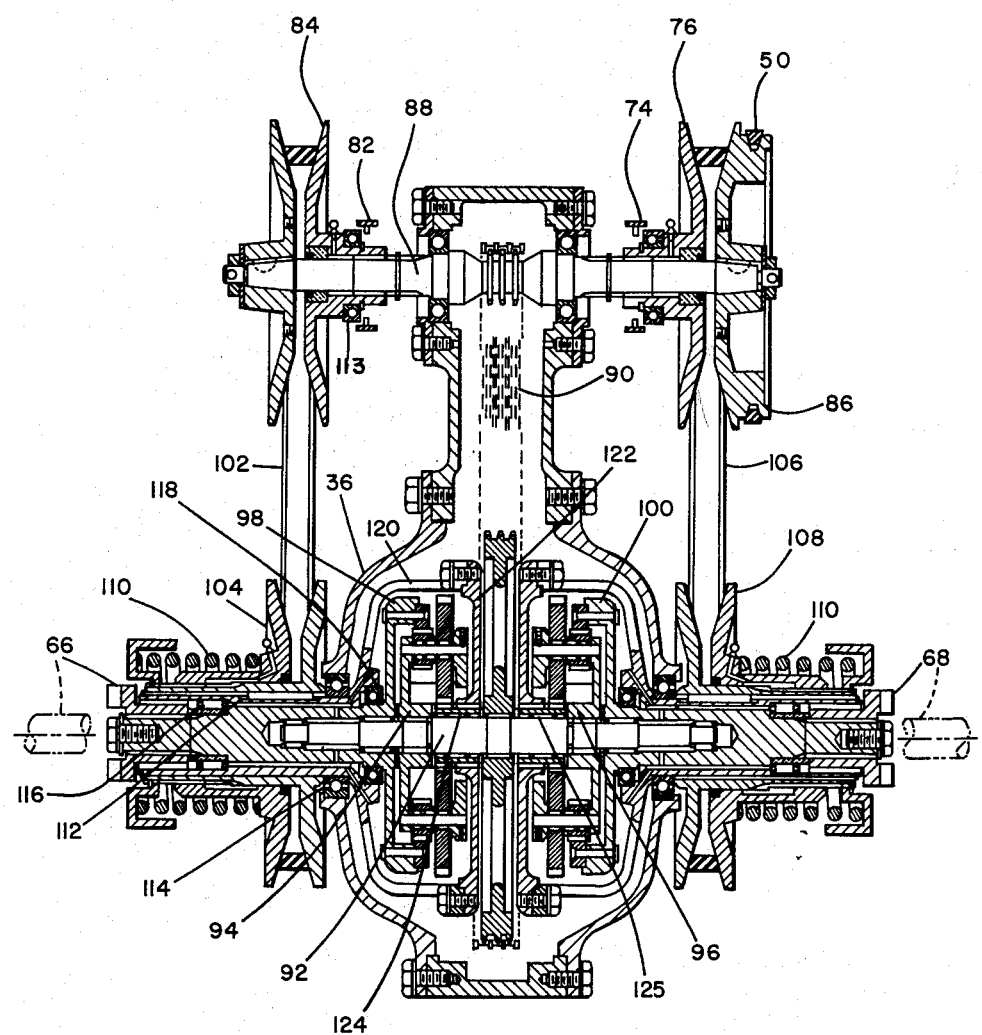
FIGURE 5 is a transverse sectional view of the transmission taken along the lines V—V of FIGURE 3.

More particularly in FIGURES 1 and 2 of the drawings, a vehicle 10 embodying the present transmission is shown having an upstanding, centrally mounted control lever 12 which is of the unitary or unilever type and which is disposed at the front of the driver's seat 14 of the vehicle. The control lever 12 carries a fixed head 16 of generally square shape through which the longitudinal axis 18 of the lever extends.

A rocking base block 20 supports a reduced lower portion of the lever 12 in ball bearings 22 enabling the lever to turn on its axis 18. Block 20 is trunnioned in ball bearings 24 enabling the lever 12 to pivot about a transverse axis 26 passing through the reduced portion of the lever. Right and left arms 28 and 30 fixed to the lower end of the lever 12 carry laterally disposed balls forming joints with respective transmission connected drag links 32 and 34.

The lever 12 is operated to select the drive ratio in a transmission 36 by means of which the driver steers the vehicle by differentially driving a near wheel 38 and a far wheel 40 as viewed in FIGURE 1 which are carried by the vehicle 10 at the right and left sides respectively. A caster wheel 42 supports the front of the vehicle at a point between the sides, freely revolving about a vertically disposed caster axis 44 so as to track squarely in the direction of the turn.

In an engine compartment 46 disposed at the rear of the driver's seat 14, a suitable power source such as an internal combustion engine 48 is provided which is connected by means of a V-belt 50 to drive the transmission 36. An idler pulley is movable from the dotted line position shown by the dotted lines 52b into the dotted line position 52a for placing the belt 50 under driving tension to apply input power to the transmission 36. The engine 48 is utilized for propulsion and in operating whatever power equipment the vehicle 10 is designed to carry. The particular vehicle 10 illustrated carried a rotary mower, not shown, adapted to be driven by the engine 48 while the engine 48 simultaneously propelled the vehicle.

In FIGURES 3 and 4, the drag links 32 and 34 are connected to the lower end portions 54 and 56 of a pair of transmission levers 58 and 60 which are independently movable on a common pivot shaft 62. When tilted forwardly or rearwardly from their neutral or zero speed position shown by the dotted lines 64 in FIGURE 3, they each cause the opposite one of the wheel axles 66 and 68 to drive forwardly or rearwardly respectively as will now be explained.

The drag links 32 and 34 establish connections whereby the left arm 30 of the control lever 12 is connected to the left or rearwardly positioned transmission lever 60 as viewed in FIGURE 3 and the right arm 28 of the control lever 12 is connected to the near transmission lever 58 of FIGURE 3. So long as the lever 12 is subjected purely to forwardly tilting or rearwardly tilting movement, the transmission levers 58 and 60 duplicate this movement by conjointly tilting forwardly and rearwardly respectively. Preferably a friction device, not shown, is provided somewhere in contact with the linkage comprising the links 32 and 34, tending to hold the lever 12 and the transmission levers 58 and 60 in the positions in which they are set by the driver.

The transmission lever 58 appearing in the forwardly advanced position of FIGURE 3 operates through a link 70 to pivot a cross connection lever 72 forwardly causing the axle 68 to rotate in the forward direction as indicated by the arrow of FIGURE 4. It does so through the intermediary of a shifter fork 74 which moves allowing an increase of width between the halves of an adjustable input sheave 76.

The transmission lever 60 shown in a rearward position in FIGURE 3, is operative through a link 78 to pivot a cross connection lever 80 rearwardly. In so moving, the lever 80 operates a shift fork 82 of the transmission in a direction narrowing the halves of another adjustable input sheave 84 causing the associated wheel connected axle 66 to drive rearwardly in the direction of the arrow of FIGURE 4. Thus, the vehicle pivots to the right, i.e. clockwise on the ground about some point which is theoretically midway between the traction wheels 38 and 40. Tilting the levers in the opposite direction causes the vehicle to pivot counter-clockwise. It is apparent that an infinite number of positions of the transmission levers 58 and 60 can be readily effected according to the driver's desire, and illustrative ones of some principal combinations of positions to produce the operation desired are hereinafter referred to.

In FIGURE 5, the transmission 36 includes a drive sheave 86 which is combined with one of the halves of the adjustable sheave 76 and which is driven by the engine belt 50. The adjustable sheaves 76 and 84 are fast to a common input shaft 88 journaled in the upper end of the case of the transmission 36. A chain and sprocket drive 90 establishes a positive reduction drive between the input shaft 88 and a quill shaft 92 which is piloted at its opposite ends in bearings carried by the respective wheel connected axles 66 and 68. The quill shaft 92 is drivingly connected to pinion carriers 94 and 96 at opposite ends thereof to establish the primary power train through a planetary gear transmission disposed one at each side of the main drive. The reaction member of each planetary transmission consists of a respective ring gear 98 and 100 which gears are the respective output elements fast to the opposite wheel connected axles 66 and 68.

An endless V-belt 102, which is trained over the variable width sheave 84 and a sun driving output sheave 104, and another V-belt 106 which is trained over the variable width sheave 76 and over a sun connected sheave 108 form portions of secondary planetary drive trains. In the interests of brevity only the train including the sheaves 84 and 104 for varying the pitch line ratio of the belt 102 is described in detail.

A heavy coil spring 110 surrounding the wheel connected axle 66 exerts a constant bias to force together the halves of the sheave 104 thus tending to make the belt 102 ride outwardly toward its maximum pitch line diameter on the sheave 104. In opposition, the shift fork 82 acts through a ball bearing 113 tending to force the belt 102 to ride outwardly to maximum pitch line diameter of the sheave 84.

The sheave 104 is splined to an outer shaft 112 supported on a ball bearing 114 for rotation in the case of the transmission 36. The outer shaft 112 supports an outer roller bearing 116 and an inner ball bearing 118 in which the axle 66 is journaled. The outer shaft 112 has a spider shell 120 integral therewith which carries an inner disc 122 having the hub splined to a sun gear 124.

In FIGURE 6, the pinion carrier 94 has a plurality of pinion clusters each carried by an individual shaft 126. A large pinion 128 of each cluster meshes with the sun gear 124. A smaller pinion 130 which is integral with the larger pinion 128 meshes with the ring gear 98.

In the operation of the transmission of FIGURES 1 and 3–6, the input shaft 88 rotates in what will be termed a forward direction as shown by the associated arrow in FIGURE 3 and the belts 102 and 106 assume a corresponding direction of rotation as indicated by the arrows associated with the belt 102 of FIGURE 3. The quill shaft 92 of the common primary power train rotates in the same forward direction as the input shaft 88 but in fixed ratio at a slower speed. The carrier 94 rotates at this same slower speed forwardly whereas the sun gear 124 rotates at a considerably higher forward speed enabling the outer periphery of the small planet 130 to move in the retrograde direction at the same speed at which the carrier 94 is bodily advancing the small pinion forwardly; in this situation, known as the neutral or zero speed position, the output ring gear 98 remains stationary holding associated ground wheel 38 (FIGURE 1) still. Similarly the opposite wheel 40 is stationary when the other secondary planetary train is conditioned in the zero speed position.

Forwardly tilting the transmission lever 60 through the dotted line position 64 of FIGURE 3 into a forward position causes the fork 82 to shift rightwardly as viewed in FIGURE 5 thus increasing the width of the sheave 84 and decreasing the pitch line diameter of the belt 102. The spring 110 expands, causing the sheave 104 to narrow, reducing the drive ratio and speed of the sheave 104 and the sun gear 124. The stationary ring gear 98 is thereby forced into forward rotation driving the axle 66 and the near wheel 38 of FIGURE 1 forwardly. Rearwardly tilting the lever 60 produces retrograde rotation of the ring gear, thus causing the rearward drive of axle 66 as previously described.

From the foregoing, it is seen that with the carriers 94 and 96 turning at a constant speed, the speed and torque of the axle 66 may be varied by varying the speed of the sun gear 124; similarly the speed and torque of the other axle 68 may be varied by varying the speed of its associated sun gear 125. Thus, to effect backward movement of the vehicle, the speed of rotation of the sun gears 124 and 125 is increased by operating the shift forks 82 and 74 to narrow the sheaves 84 and 76 thereby increasing the ratio and the speed of the belts 102 and 106. Conversely, to effect forward movement of the vehicle from a standstill position, the speed of rotation of the sun gears 124 and 125 is decreased by operating the shift forks 82 and 74 to widen the sheaves 84 and 76 thus decreasing the speed of the belts 102 and 106. Hence the rate of speed of the vehicle is controlled through the transmission in a natural feeling way, i.e., the faster one desires to move in the direction he is proceeding, the more he tilts the control lever 12 in that direction.

In the modification of the transmission shown in FIGURE 7, a V-belt drive 250 connects a power source 248 and a common input shaft 288 of the transmission. The input shaft 288 is drivingly connected to planetary gear sets 289 by a primary train consisting of a gear 290 fast to the shaft 288, an idler pinion 291, and a gear 293 fast to a carrier-driving quill shaft 292. A carrier 294 within each planetary set 289 is connected to the quill shaft 292 and carries a plurality of planet pinions 296 meshing at their inner periphery with a sun gear 297. At the outer periphery the pinions mesh with a ring gear 298, the sun being connected by means of a spider shell to a variable width pulley 204 and the ring gear 298 being connected with a wheel-connected axle 66.

The pulley 204 and a companion pulley 204 are connected by belts 202 with variable width pulleys 276 to form secondary power trains leading from the input shaft 288. Each of the pulleys is controlled by a shifter fork 282 which is operated by a drag link 232 leading from the driver's position on the vehicle.

A neutral position is accomplished by positioning the shifter forks 282 so that the ratio between the pulleys 276 and 204 on each side is the same as that between the carrier 294 and the sun gear 297 at that side. In the particular embodiment illustrated, the speed of the pulleys 276 and 204 is equal to one another and the speed of the carrier and of the sun is equal to one another. The axles 66 therefore do not move.

Decreasing the speed of the sun gears by widening the pulleys 276 and decreasing the speed of the belts 202 causes forward rotation of the axles 66 so that the vehicle advances. Increasing the speed of the sun gears by narrowing the pulleys 276 to increase the belt speed causes the axles 66 to reverse and the vehicle to move rearwardly.

The steering of the vehicle by driving is readily followed by reference to FIGURES 1, 2, 3, and 5. The operation of the embodiment of FIGURE 7 is similarly followed, despite the fact that the power source and drag links 232 are depicted in the flat with the transmission so as to include the entire system in a single, primarily schematic view. In other words, driver induced tension exerted in the drag links 232 in the direction of the arrows of FIGURE 7 has the same effect as driver induced tension in the links 32 and 34 causing the links to shift in the direction of the arrow of FIGURE 3. The resisting springs 210 (FIGURE 7) and 110 (FIGURE 5) act in opposition to this tension, with the springs until they are overcome acting to bias the variable width pulleys in a direction to decrease the sun gear speed and to produce or to increase the rate of forward movement of the vehicle. The driver, facing forwardly, advances the lever 12 of FIGURE 1 by a moderate amount from the neutral position into a dotted line, forwardly tilted position shown by the dotted lines 12a. The right and left axles respond by driving slowly forwardly due to the conjoint forward tilt of the transmission levers, each of which takes a position corresponding to the solid line position 58 of the transmission lever 58 of FIGURE 3.

For a turn, the driver can then slightly retract only the head portion 17 of the control lever 12 which is at his left. In FIGURE 2 it is seen that he thus forces the lever arm 30 and the drag link 34 to retract, making the transmission lever 58 (FIG. 3) tilt farther forwardly from the solid line position 58 shown. The transmission at his right correspondingly increases the forward speed ratio of the axle 66 at his right and the vehicle begins, in accordance with the natural feel of steering, a turn forwardly and to the left.

If the driver follows the foregoing procedure and, at the same time, slightly advances the head portion 15 of the lever so that the head takes the dotted line position shown by the dotted lines 16a of FIGURE 2, he succeeds in accentuating the turn in the left forward direction. The control lever arm 28 rotates forwardly making the drag link 32 advance into the dotted line position shown by the dotted lines 32a of FIG. 2, thus forcing the transmission lever which is on the transmission portion on the inside of the turn to approach neutral or mid position. The axle on the inside of the turn decreases speed, or if more greatly affected stops, or if further affected reverses whereupon the vehicle undergoes a more drastic left turn.

Movement of the unicontrol lever 12 into the backwardly tilted dotted line position 12b of FIGURE 1 causes straight rearward movement of the vehicle, i.e. movement to the left as viewed in FIGURE 1. The driver will have taken an appropriate position with his head or head and shoulders facing in the rearward direction. To make a turn rearwardly and leftwardly in his view, the driver twists the lever head 16 into the dotted line position 16a of FIGURE 2 thereby complementing the existing rearward tilt of the lever 12 by additionally increasing tension in the drag link 32 so as to pull it farther. This twisting has simultaneously moved the other drag link 34 in the opposite or restoring direction, the result being that the outside axle 66 during the rearward left turn increases reverse speed whereas the inside axle 66, depending on the severity of turn required, either decreases speed, stops, or drives forwardly if a very short rearward turn is desired.

As herein disclosed, the principles of the invention are shown embodied according to the transmissions of FIGURES 5 and 7. They provide the same maximum forward and maximum rearward speeds when their input speeds are the same, varying smoothly from one maximum to the other through infinite speed ratios down through and including zero speed. No performance is sacrificed in the preferred embodiment of FIGURE 5 despite the fact that the chain and sprocket drive 90 and the pinion clusters carried by the carrier 94 and 96 operate under a desirably reduced speed ratio whereby the sun gears 124 and 125 and the carriers 94 and 96 have relatively low speeds compared to the input shaft 88.

Having described the invention with sufficient clarity to enable those familiar with this art to construct and use it, we claim:

A variable ratio drive mechanism including, in combination:
  a power driven input shaft;
  a pair of driven shafts;
  a primary power transmission train operably interconnecting said input shaft and said driven shafts;
  secondary power transmission trains operably interconnecting said input shaft and said driven shafts;
  planetary gear assemblies, each having a sun gear, planet gears, and a ring gear and coupling said power transmission trains to said driven shafts respectively, the sun gear of each planetary gear assembly being driven by a respective secondary power transmission train, the planet gears of each of said gear assemblies being driven by the primary power transmission train, and the ring gear of each of said gear assemblies being rigidly mounted upon a respective one of said driven shafts, and deriving its speed and torque from the sun and planet gears of its assembly;
  belt and variable pulley assemblies within each of said secondary power transmission trains for varying the speed at which the planet gears of each gear assembly are rotated;
  and control means coupled with the respective variable pulleys of said belt and pulley assemblies for independently varying their effective diameter.

References Cited by the Examiner
UNITED STATES PATENTS 2,421,139    5/47    Barnhart _____ 74—388 X
2,889,716    6/59    Doty _____ 74—689

DON A. WAITE, *Primary Examiner.*